United States Patent
Patel et al.

(10) Patent No.: US 12,485,885 B2
(45) Date of Patent: Dec. 2, 2025

(54) VEHICLE LATERAL POSITIONING ON A NON-DIVIDED ROAD

(71) Applicant: GM GLOBAL TECHNOLOGY OPERATIONS LLC, Detroit, MI (US)

(72) Inventors: Harsh K. Patel, Farmington Hills, MI (US); Paul A. Adam, Milford, MI (US); Xuefei Yang, Northville, MI (US); Brian M. Porto, Novi, MI (US); Christopher M. Churay, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 258 days.

(21) Appl. No.: 18/364,523

(22) Filed: Aug. 3, 2023

(65) Prior Publication Data
US 2025/0042393 A1    Feb. 6, 2025

(51) Int. Cl.
*B60W 30/09*    (2012.01)

(52) U.S. Cl.
CPC ......... *B60W 30/09* (2013.01); *B60W 2540/18* (2013.01); *B60W 2552/05* (2020.02);
(Continued)

(58) Field of Classification Search
CPC ............. B60W 30/09; B60W 2540/18; B60W 2552/05; B60W 2552/10; B60W 2554/4029; B60W 2554/4041; B60W 2554/4042; B60W 2554/801; B60W 2554/802; B60W 2520/10;
(Continued)

(56) References Cited

U.S. PATENT DOCUMENTS

| 5,483,453 A | * | 1/1996 | Uemura | ............... | G05D 1/0255 |
| | | | | | 318/587 |
| 2005/0228588 A1 | * | 10/2005 | Braeuchle | ......... | B60W 50/0097 |
| | | | | | 701/301 |

(Continued)

FOREIGN PATENT DOCUMENTS

| DE | 10218010 A1 | 11/2003 |
| DE | 102017006835 A1 | * 1/2019 ............ B60W 30/10 |

OTHER PUBLICATIONS

Keiwan, DE102017006835A1_Machine Translation (Year: 2017).*

*Primary Examiner* — Jelani A Smith
*Assistant Examiner* — Alyssa Rorie
(74) *Attorney, Agent, or Firm* — Quinn IP Law (57) ABSTRACT

A system for controlling lateral positioning in a host vehicle includes a controller having a processor and tangible, non-transitory memory. The host vehicle is located on a host lane defined by a host lane center. The controller is adapted to determine if a first and second enabling condition are met. The first enabling condition is met when the host vehicle is travelling on a non-divided road having no physical barrier separating respective traffic lanes travelling in opposing directions. The second enabling condition is met when the host lane is an inner most lane adjacent to an opposing traffic lane. When the first and second enabling conditions are both met, the controller is adapted to determine a non-divided road offset relative to the host lane center in real-time. Operation of the vehicle is controlled based in part on a magnitude, and a direction of the non-divided road offset.

16 Claims, 6 Drawing Sheets

(52) U.S. Cl.
CPC . *B60W 2552/10* (2020.02); *B60W 2554/4029* (2020.02); *B60W 2554/4041* (2020.02); *B60W 2554/4042* (2020.02); *B60W 2554/801* (2020.02); *B60W 2554/802* (2020.02)

(58) Field of Classification Search
CPC ............. B60W 2552/53; B60W 30/12; B60W 30/18163; B60W 40/06
See application file for complete search history.

(56) References Cited

U.S. PATENT DOCUMENTS

| | | | |
|---|---|---|---|
| 2007/0198188 A1* | 8/2007 | Leineweber | B60W 30/16 |
| | | | 701/117 |
| 2014/0121880 A1* | 5/2014 | Dolgov | B60W 10/20 |
| | | | 701/1 |
| 2021/0191406 A1* | 6/2021 | Shalev-Shwartz | ............................ |
| | | | B60W 60/001 |
| 2022/0315053 A1* | 10/2022 | Wada | B60W 30/12 |
| 2024/0025403 A1* | 1/2024 | Tomioka | B60W 30/12 |
| 2024/0375650 A1* | 11/2024 | Kawashima | B60W 30/12 |

* cited by examiner

VEHICLE LATERAL POSITIONING ON A NON-DIVIDED ROAD

INTRODUCTION

The present disclosure relates generally to lateral positioning of a vehicle. More particularly, the disclosure relates to a system and method of controlling lateral positioning of a host vehicle travelling on a non-divided road. Automated driving systems provide assistance in driving functions using a combination of sensors, such as lidar map data, cameras, and radar sensors. The driving function assistance may include acceleration or braking of the vehicle to maintain a specific following distance from other vehicles ahead. The driving function assistance may include a lane centering system. However, lane centering control may be challenging when the vehicle is travelling on a road without a physical barrier separating the opposing traffic lanes.

SUMMARY

Disclosed herein is a system for controlling lateral positioning in a host vehicle. The host vehicle is located on a host lane defined by a host lane center. The system includes a controller having a processor and tangible, non-transitory memory on which instructions are recorded. The controller is adapted to determine if a first enabling condition and a second enabling condition are met. The first enabling condition is met when the host vehicle is travelling on a non-divided road. The non-divided road lacks or has no physical barrier separating respective traffic lanes travelling in opposing directions. The second enabling condition is met when the host lane is an inner most lane adjacent to an opposing traffic lane.

When the first enabling condition and the second enabling condition are both met, the controller is adapted to determine a non-divided road offset relative to the host lane center for the host vehicle in real-time. The non-divided road offset is based on a plurality of factors. Operation of the vehicle is controlled based in part on a magnitude, and a direction of the non-divided road offset.

In some embodiments, the non-divided road includes a non-drivable surface between respective traffic lanes travelling in opposing directions, the non-drivable surface having a lateral width less a predefined threshold distance. The predefined threshold distance may be between about 2.5 meters and 4 meters. The plurality of factors may include a pedestrian gain. The controller is adapted to apply the pedestrian gain when a pedestrian is detected within minimum longitudinal distance from the host vehicle and/or a minimum lateral distance from the host vehicle. The plurality of factors may include a shoulder gain. The controller is adapted to apply the shoulder gain when a nearby adjacent surface is detected as a lane edge, the shoulder gain being based in part on a lateral distance of the lane edge from a boundary of the host lane.

The controller may be adapted to determine a net lateral offset for the host vehicle based in part on the non-divided road offset and an offset correction. The offset correction includes a vehicle encroachment lateral offset based on a target vehicle, where the target vehicle is within a predefined proximity of the host vehicle. The target vehicle may be in an oncoming lane adjacent to the host lane, the target vehicle travelling in an opposite direction relative to the host vehicle. The target vehicle may be in a lane directly adjacent to the host lane, the target vehicle travelling in a same direction as the host vehicle.

In some embodiments, the offset correction includes a steering input from an operator of the vehicle. When the offset correction and the non-divided road offset are both positive, a maximum of the offset correction and the non-divided road offset is set as the net lateral correction. When the offset correction and the non-divided road offset are both negative, a minimum of the offset correction and the non-divided road offset is set as the net lateral correction. When the offset correction and the non-divided road offset are in opposite directions, a sum of the offset correction and the non-divided road offset is set as the net lateral offset. The controller may be adapted to selectively apply a rate limiter such that a speed of application of the net lateral offset is faster when the target vehicle has a relatively high velocity compared to when the target vehicle has a relatively low velocity.

Disclosed herein is a method of controlling lateral positioning in a host vehicle with a controller having a processor and tangible, non-transitory memory on which instructions are recorded. The method includes determining if a first enabling condition and a second enabling condition are met, via the controller, the host vehicle being located on a host lane defined by a host lane center. The first enabling condition is met when the host vehicle is travelling on a non-divided road. The non-divided road lacks a physical barrier separating respective traffic lanes travelling in opposing directions. The second enabling condition is met when the host lane is an inner most lane adjacent to an opposing traffic lane. The method includes determining a non-divided road offset relative to the host lane center for the host vehicle in real-time when the first enabling condition and the second enabling conditions are both met, via the controller, the lateral offset being based on a plurality of factors. The method includes controlling operation of the vehicle based in part on a magnitude of the lateral offset, and a direction of the non-divided road offset.

The above features and advantages and other features and advantages of the present disclosure are readily apparent from the following detailed description of the best modes for carrying out the disclosure when taken in connection with the accompanying drawings.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 1:
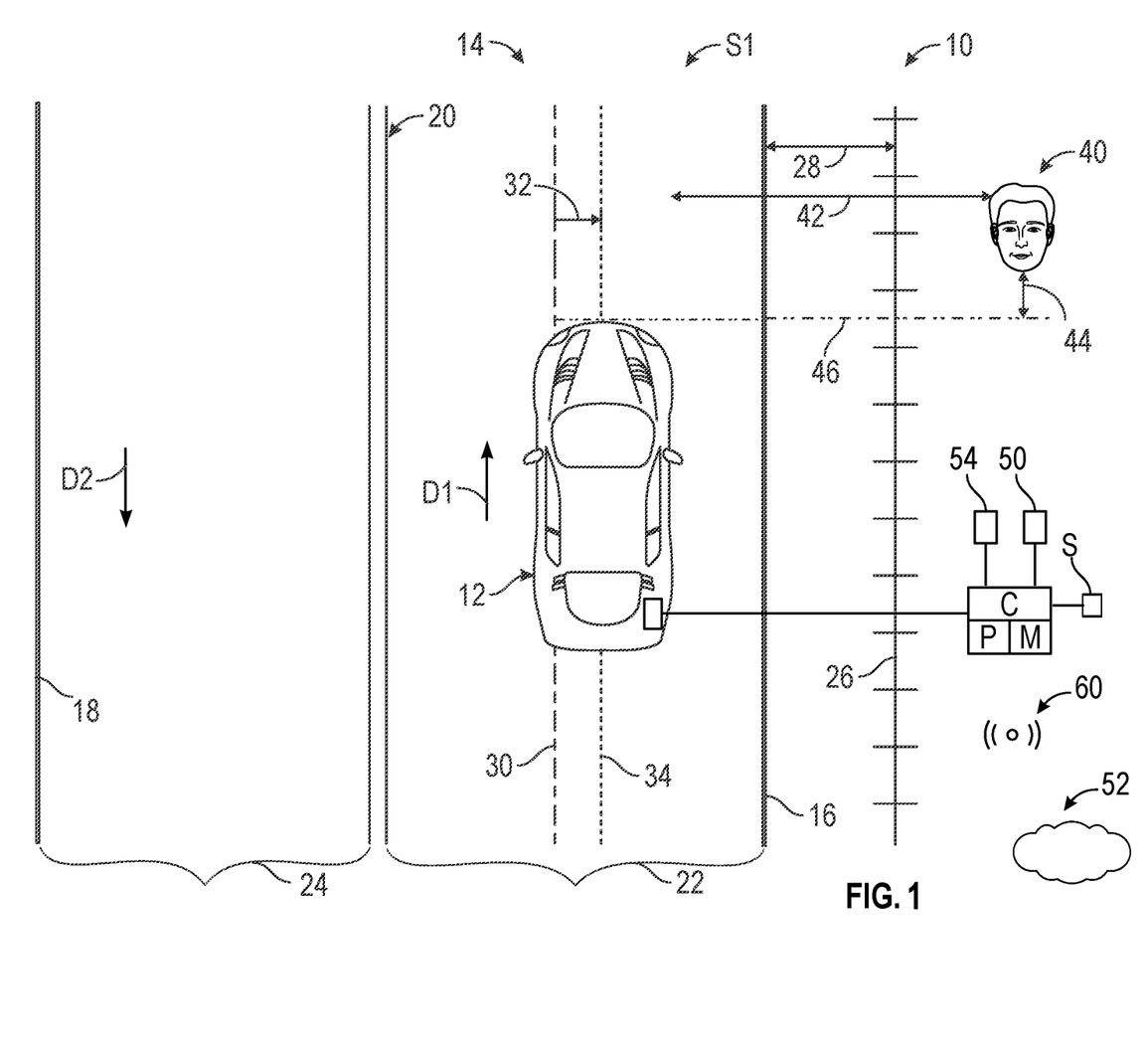
FIG. 1 is a schematic fragmentary diagram of a host vehicle on a non-divided road, the host vehicle having a controller and being in a first scenario.
Figure 3:
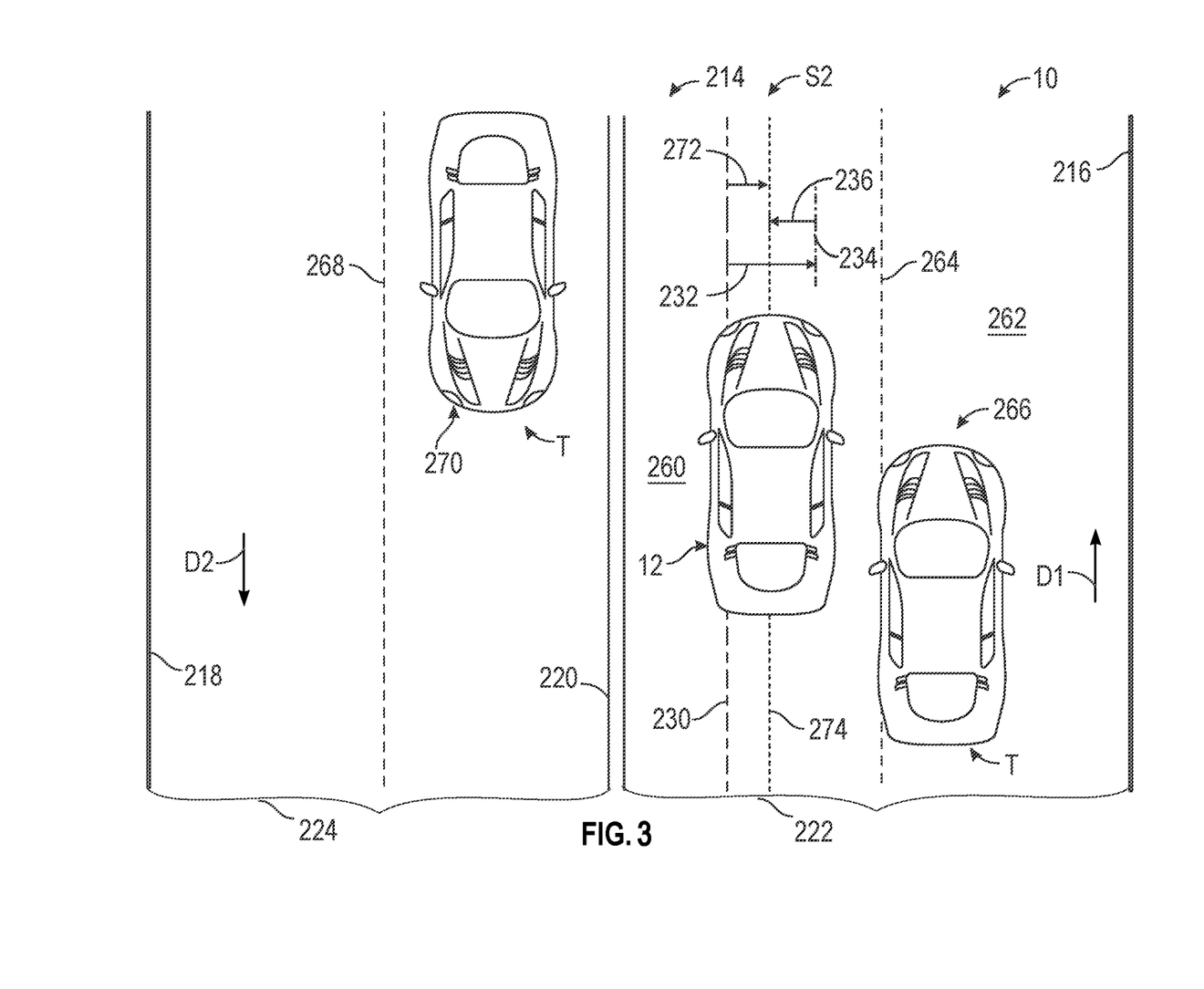
FIG. 3 is a schematic fragmentary diagram of the host vehicle of FIG. 1 in a second scenario.

Referring to the drawings, wherein like reference numbers refer to like components, FIG. 1 schematically illustrate a system 10 for controlling lateral positioning of a host vehicle 12 travelling on a non-divided road, examples of which are shown in FIGS. 1 and 3. The host vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The host vehicle 12 may be an electric vehicle. It is to be understood that the host vehicle 12 may take many different forms and have additional components.

As used herein, a non-divided road is understood to be a road having no physical barrier separating the opposing traffic lanes. The physical barrier may be a wall, barricade, fence, or other similar structure. The non-divided road may include a non-drivable surface (e.g., the dividing section 20, 220 in FIGS. 1, 3 respectively) having a lateral width that is below a predefined threshold distance. The predefined threshold distance may be between about 2.5 meters and 4 meters. In one example, the predefined threshold distance is set as 3.5 meters. In other words, if the non-divided road includes a non-drivable surface that is less than the threshold distance separating the opposing traffic lanes, it is categorized a non-divided road.

Referring to FIG. 1, the controller C has at least one processor P and at least one memory M (or non-transitory, tangible computer readable storage medium on which instructions may be recorded for selectively executing one or more modules 50 for controlling operation of the host vehicle 12 when travelling on a non-divided road, examples of which are shown in FIGS. 1 and 3. The modules 50 include a road offset module 100, a vehicle encroachment correction module 300, and a net lateral correction module 400, which are described below with respect to FIGS. 2A-2B, 4, and 5, respectively.

FIG. 1 shows the host vehicle 12 on the non-divided road 14 in a first scenario S1. FIG. 3 shows the host vehicle 12 on a non-divided road 214 in a second scenario S2. The non-divided road may have a single through lane in each direction (such as non-divided road 14 shown in FIG. 1) or multiple through lanes proceeding in the same direction (such as non-divided road 214 shown in FIG. 3).

Figure 4:
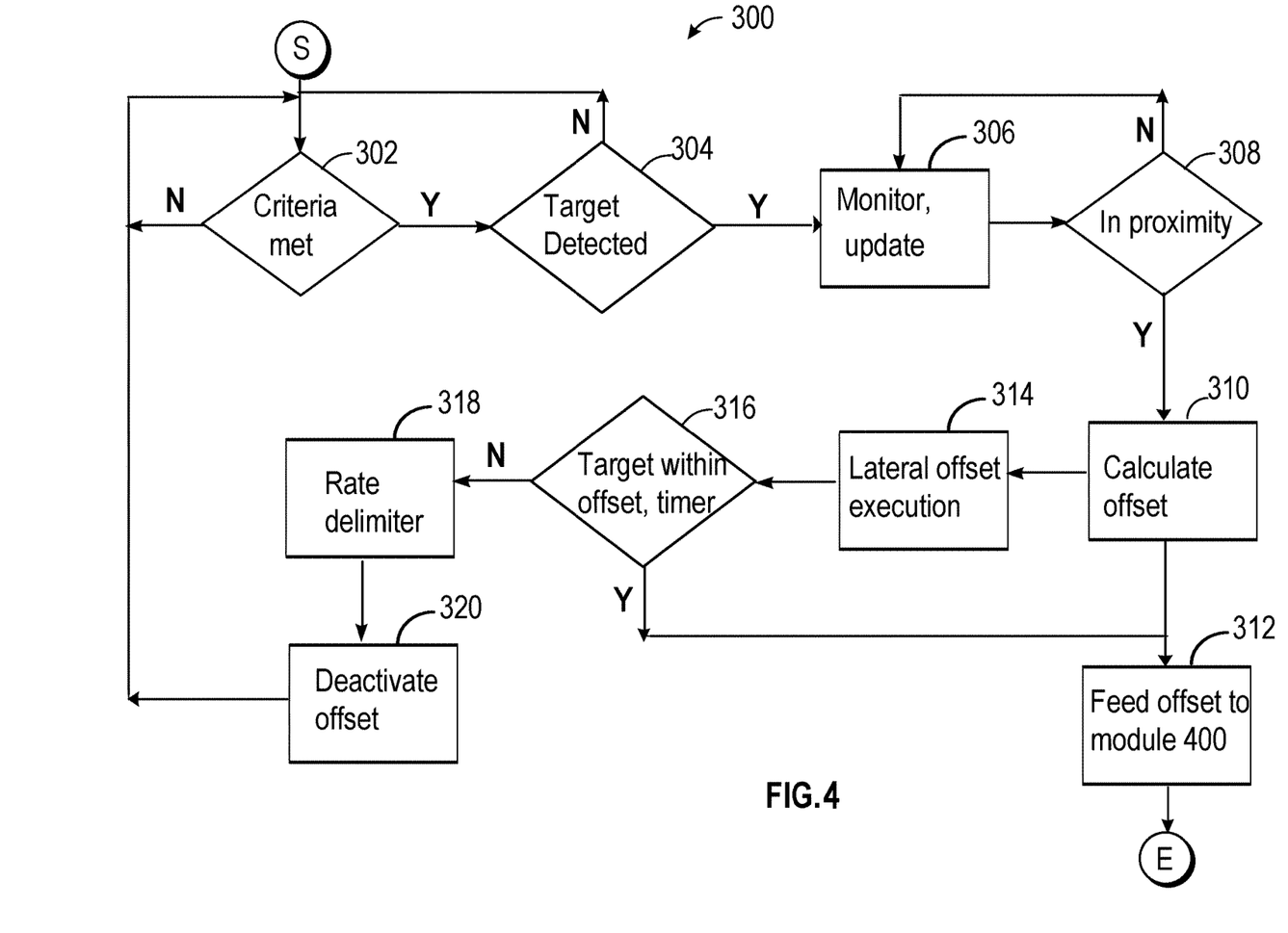
FIG. 4 is a flowchart for a vehicle encroachment correction module executable by the controller of FIG. 1.

The road offset module 100 obtains a non-divided road offset 32, 232 based on the characteristics of the non-divided road 14, 214. Referring to FIGS. 3-4, the vehicle encroachment correction module 300 allows modification of the non-divided road offset 232 in case of a target vehicle T located in the on-coming lane (e.g., oncoming vehicle 270) or adjacent lane (e.g., adjacent vehicle 266) encroaching into the host lane 260 or to generate specific vehicle movement patterns when required.

In the first scenario S1 shown in FIG. 1, the non-divided road 14 extends between a first boundary 16 and a second boundary 18, with a dividing section 20 separating traffic going in opposite directions. The dividing section 20 may be at the center of the non-divided road 14. Referring to FIG. 1, the non-divided road 14 includes a first lane 22 between the first boundary 16 and the dividing section 20, designated for traffic in a first direction D1. The non-divided road 14 includes a second lane 24 between the second boundary 18 and the dividing section 20, designated for traffic in a second direction D2. The non-divided road 14 may include a lane edge 26, e.g., a guard rail line, that is adjacent to the first boundary 16. The lane edge 26 is at a lateral distance 28 from the first boundary 16. In the example shown in FIG. 1, the host vehicle 12 is in the first lane 22 defined by a host lane center 30. The host lane center 30 indicates an approximate center between the dividing section 20 and the first boundary 16.

As described below, the system 10 enables calculation of a dynamically varying amount and direction of a non-divided road offset 32 relative to the host lane center 30 for a non-divided road 14. The controller C is adapted to establish entry and exit criteria for applying and removing the non-divided road offset 32 in non-divided road operations where offsets in contradicting directions (left vs right) are desired.

The non-divided road offset 32 is calculated based on a plurality of factors, including environmental factors such as the surface type of the road, and width of the host lane 22. The plurality of factors may include detection of a pedestrian 40, lane class type, trailering mode, road configuration, and the relative lane position of the vehicle 12. The system 10 is adapted to monitor traffic patterns on either side of the host vehicle 12 i.e., on-coming and same-direction target lateral encroachment. Based on these factors, the magnitude and direction of a net lateral offset (via execution of the net lateral correction module 400 in FIG. 5) is arbitrated to determine a final lateral vehicle path trajectory (e.g., optimal path 274 in FIG. 3). Additionally, as described below, the system 10 enables determination of a total duration of offset application and/or conditions for when the lateral offset may not be applied due to similarly weighted constraints on opposing sides of the host lane 22.

The controller C may receive data from one or more sensors S positioned on or about the vehicle 12, such as a radar unit, a lidar unit, a camera, and an inertial measurement unit. The sensors S may be employed for detecting a pedestrian 40 (see FIG. 1) and a target vehicle T (see FIG. 3). It is understood that the sensors S may incorporate other types of technologies available to those skilled in the art.

Referring to FIG. 1, the controller C is in communication with a remotely located cloud computing service 52. The cloud computing service 52 may include one or more remote servers hosted on the Internet to store, manage, and process data. The cloud computing service 52 may be at least partially managed by personnel at various locations. The vehicle 12 may include a telematics module 54 for aiding two-way communications with the cloud computing service 52, shown in FIG. 1. The telematics module 54 may collect telemetry data, such as location, speed, and servicing requirements, by interfacing with various internal sub-systems of the vehicle 12. The telematics module 54 may enable vehicle-to-vehicle communication (V2V) and/or a vehicle-to-everything communication (V2X).

The modules 50 may be embodied as computer-readable code or instructions stored on and partially executable by the controller C of FIG. 1. It is understood that the modules 50 are independent of one another. The modules 50 may be consecutively or concurrently executed. The modules 50 may be executed in real-time, continuously, systematically, sporadically and/or at regular intervals, for example, each 10 milliseconds during normal and ongoing operation of the vehicle 12. The memory M may store controller-executable instruction sets, and the processor P may execute the controller-executable instruction sets stored in the memory M.

Figure 2A:
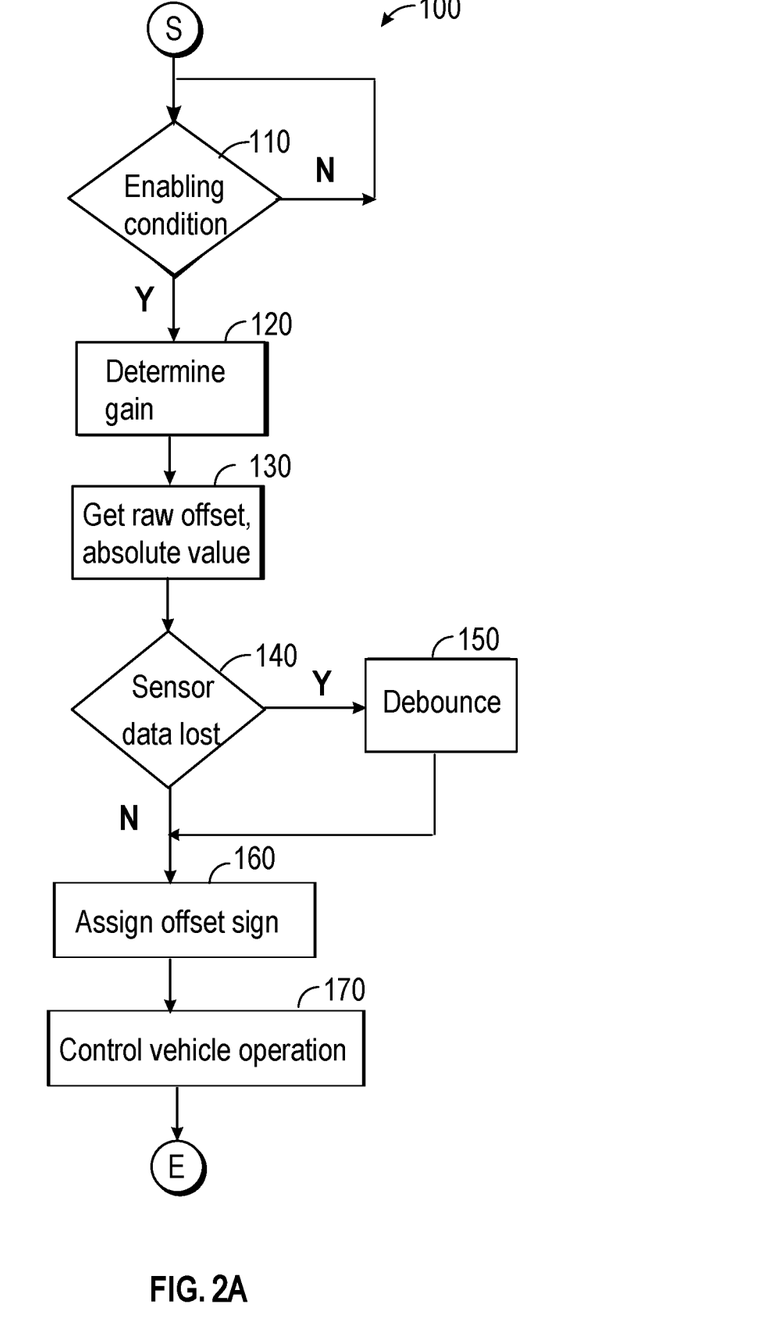
FIG. 2A is a flowchart for a road offset module executable by the controller of FIG. 1.

Referring now to FIG. 2A, an example flowchart of the road offset module 100 is shown, which may be dynamically executed and need not be applied in the specific order recited herein. Furthermore, it is to be understood that some steps may be eliminated.

Beginning at block 110 of FIG. 2A, the controller C is adapted to determine if two enabling conditions are met: (1) the host vehicle 12 is travelling on a non-divided road 14; and (2) the host vehicle 12 is located on an inner most lane adjacent to an opposing lane, i.e. the host vehicle 12 is directly adjacent to traffic coming in the opposite direction. The inner most lane is the left-most lane in a left-hand drive system or the right-most lane in a right-hand drive system. The non-divided road is characterized by the absence of a physical barrier separating respective traffic lanes travelling in opposing directions.

If the first and second enabling conditions are both met (block 110=YES), the module 100 proceeds to block 120 to determine the magnitude of a set of environmental gain factors. Each of the gain factors has a value between zero and one, inclusive. Block 120 is described below in detail with respect to FIG. 2B. If the enabling conditions are not met (block 110=NO), the module 100 loops back to the start of module 100.

Figure 2B:
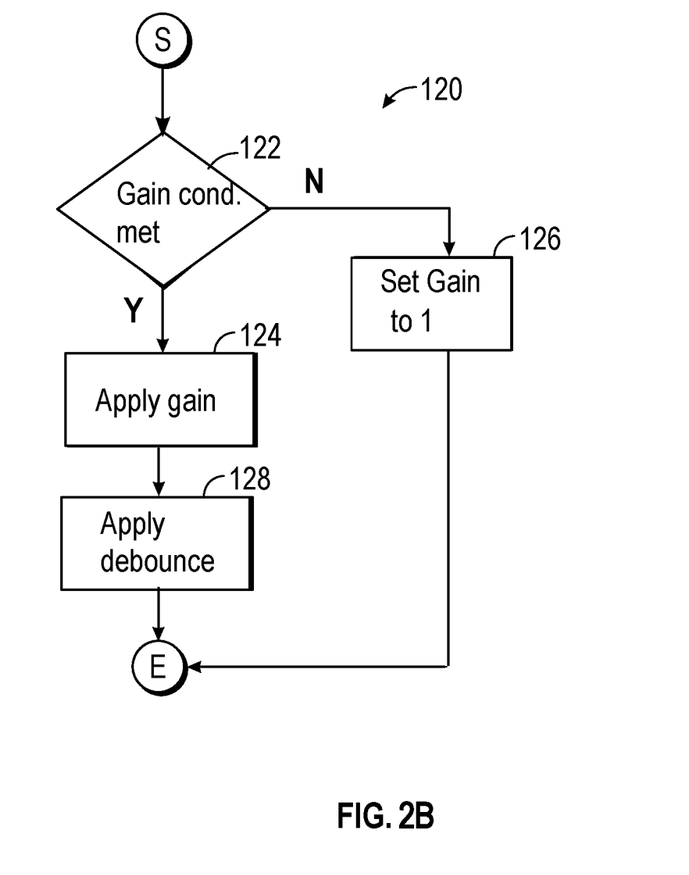
FIG. 2B is a flowchart for a portion of the module shown in FIG. 2A.

Referring to FIG. 2B, block 120 includes sub-blocks 122, 124, 126 and 128. The gain factors are used to dynamically adjust the magnitude of the base road offset and may be selected based on a look-up table or a trained artificial neural network. Examples of the gain factor include shoulder gain, pedestrian gain, and a multiple lane gain. The shoulder gain and pedestrian gain respectively contribute to the overall lateral offset to avoid approaching either the lane edge 26 (e.g., guard rail) or pedestrian 40, respectively. If more than one lane is present next to the host lane 22 which operates in the same direction as that of the host lane and it is not a return of travel direction turn lane, a multiple lane gain may be used to allow the host vehicle 12 not to get too close to an adjacent target vehicle operating in the same direction.

Per sub-block 122 of FIG. 2B, the controller C is adapted to determine if a gain condition is met. For the pedestrian gain, the gain condition is met if the pedestrian 40 is within a minimum longitudinal distance (e.g., longitudinal distance 44 from a front end 46 of the host vehicle 12) and a minimum lateral distance (e.g., lateral distance 42) from the host vehicle 12. The minimum longitudinal distance and minimum lateral distance may be based on the value of time obtained by dividing the distance between the host vehicle 12 and the pedestrian 40 by the relative speed of the host vehicle 12 and the pedestrian 40, at an instant in time.

For the shoulder gain, the gain condition is met when a nearby adjacent surface is detected as a lane edge. In other words, if the adjacent surface within a distance threshold has been detected as particular type of lane edge 26, e.g., barrier or ditch. The value of the shoulder gain is based on the type of the lane edge and a lateral distance 28 of the lane edge 26 from a boundary 16 of the host lane 22. For multiple lane gain, the gain condition is met if (1) multiple lanes are present next to the host lane in the same direction; and (2) if either the right lane is not the right turn lane or the left lane is not the left turn lane.

If the gain condition is met (sub-block 122=YES), the controller C is adapted to proceed to sub-block 124 to apply the gain factor. If the gain condition is not met (sub-block 122=NO), the gain value is set to one, per sub-block 126.

Proceeding from sub-block 124 to sub-block 128 FIG. 2B, debouncing protection may be employed for the pedestrian gain and shoulder gain. The debouncing protection prevents the base road offset from jumpiness if the gain condition is no longer met, e.g., the pedestrian 40 or lane edge 26 is no longer detected. If a significant change is captured in the shoulder gain (e.g., greater than 10%), then the shoulder gain may be debounced to a previous stored value for a calibratable amount of time to provide stability to the road offset. Block 120 ends after sub-blocks 126 and 128.

Referring back to FIG. 2A, the module 100 advances from block 120 to block 130. Per block 130, the controller C is adapted to determine a raw road offset through a lookup table that is based on the width of the host lane 22. The lookup table may incorporate trailering mode. For example, if a trailer attached to the host vehicle 12 extends to a certain width, the look-up table accounts for that trailer width. Also per block 130, the controller C is adapted to an absolute value of the road offset, which is a product of the raw road offset and each of the gain factors determined in block 120.

Absolute Value of Road Offset=[Raw Road Offset*Shoulder Gain*Pedestrian Gain*Multiple Lane Gain].

Proceeding from block 130 to block 140 of FIG. 2A, the controller C is adapted to determine if sensor data (e.g., navigation data, map database, radar, etc.) has been lost. If the sensor data is lost (block 140=YES), the module 100 proceeds to block 150 where a debouncing process takes place. In the debouncing process, a debounce hold timer is set up to reduce jumpiness. The absolute value of the road offset is fixed to the last stored value to provide stability until the debounce hold timer expires. The debouncing process may be accomplished through a smoothing filter. From block 150, the module 100 advances to block 160.

If the sensor data is still available (block 140=NO), the module 100 proceeds to block 160 to assign a directionality or sign (negative or positive) to the road offset. Per block 160, the sign (positive or negative) of the road offset is based on the driving convention, either left-hand drive or right-hand drive. The non-divided road offset (or lateral offset 32) has the magnitude determined in block 130 and the directionality assigned in block 160.

Advancing from block 160 to block 170 of FIG. 2A, operation of the host vehicle 12 is controlled, based in part on the magnitude of the lateral offset 32, a direction of the lateral offset 32 and a speed of application of the lateral offset 32. Per block 170, the controller C is configured to output an optimal vehicle path 34 based in part on the lateral offset 32. The controller C may be adapted to execute an automated driving operation for the vehicle 12 based on the optimal vehicle path 34. For example, the lateral offset 32 may be transmitted to a vehicle planning module, which generates an overall trajectory plan for the vehicle 12.

Referring now to FIG. 3, the host vehicle 12 is shown in a second scenario S2, with a non-divided road 214 where the host lane 260 includes an adjacent lane for traffic proceeding in the same direction D1. Referring to FIG. 3, the non-divided road 214 extends between a first boundary 216 and a second boundary 218, with a dividing section 220 separating traffic going in opposite directions. The dividing section 220 may be at the center of the non-divided road 214. The non-divided road 214 includes a first lane 222 between the first boundary 216 and the dividing section 220, designated for traffic in a first direction D1. The road 214 includes a second lane 224 between the second boundary 218 and the dividing section 220, designated for traffic in a second direction D2.

The non-divided road 214 in FIG. 3 includes multiple through lanes proceeding in the same direction. The first lane 222 includes two adjacent sub-lanes designated for traffic along the first direction D1: a host lane 260 (where the host vehicle 12 is located) and an adjacent lane 262, separated by a first lane divider 264. The host lane 260 is defined by a host lane center 230, which indicates an approximate center between the first lane divider 264 and the dividing section 220. The second lane 224 may include a respective dividing line 268.

The vehicle encroachment correction module 300 is applicable to the scenario S2. An example flowchart of the module 300 is shown in FIG. 4, which may be dynamically executed and need not be applied in the specific order recited herein. Furthermore, it is to be understood that some steps may be eliminated. Beginning at block 302 of FIG. 4, the controller C is adapted to determine if two enabling conditions are met: (1) the host vehicle 12 is travelling on a non-divided road 214; and (2) the host vehicle 12 is located on an inner most lane adjacent to an opposing lane. If both enabling conditions are met (block 302=YES), the module 300 proceeds to block 304. If not (block 302=NO), the module 300 loops to the start.

Per block 304, the controller C is adapted to determine if a target vehicle T has been detected. This may be done through data from the sensors S. For example, the camera data and long-range radar data is filtered to search for a target vehicle T. The fidelity of the targets may be determined using sensor source, confidence, and number of sensor cycles for which the target vehicle T is active. The data is filtered for targets that are longitudinally closer to the host vehicle 12. The target vehicle T may be a vehicle in the oncoming lane (e.g., oncoming vehicle 270) or in an adjacent lane (e.g., adjacent vehicle 266). An on-coming lane 224 is identified to process on-coming targets and an adjacent lane 262 is identified for a target vehicle T in the same direction.

If the target vehicle T is detected (block 304=YES), the module 300 advances to block 306, where the controller C is adapted to monitor the target vehicle T and update various parameters. For a relevant target vehicle T, the kinematics of objects i.e., relative position and velocity are monitored. The controller C may be adapted to estimate a moving average lateral and longitudinal proximity to the host vehicle 12. When the target vehicle T lands within a region of interest, the lateral offset direction, magnitude, rate limit and hold time is computed. The process is repeated for each relevant target vehicle T. If a target vehicle T is not detected (block 304=NO), the module 300 loops to the start.

Advancing from block 306 to block 308, the controller C is adapted to determine if the target vehicle T is within a predefined proximity, i.e., within both a lateral threshold distance and a longitudinal threshold distance, of the host vehicle 12.

If the target vehicle T is within proximity (block 308=YES) of the host vehicle 12, the module 300 advances to block 310, where the controller C is adapted to calculate an offset correction 236. If not (block 308=NO), the controller C is adapted to continue to monitor and update as the module 300 loops back to block 306.

From block 310, the module 300 advances to block 312 and block 314. Per block 312, the controller C is adapted to control operation of the host vehicle 12 based on the output of block 310, including transmitting the offset correction 236 to the net lateral correction module 400 (see FIG. 5) to obtain a net lateral offset 272. Per block 314, the controller C is adapted to carry out a lateral offset execution, including: (1) applying a lateral offset of the magnitude that removes lateral proximity with the target vehicle T; (2) updating a rate limiter for the lateral offset based on each target vehicle T; and (3) setting a lateral offset hold timer for each target vehicle T. The system 10 is adapted to apply rate limiters vehicles for high relative velocity and employ offset hold timers to account for sequential chain of objects.

Advancing to block 316 from block 314, the controller C is adapted to determine if the target vehicle T is within a predefined lateral region of interest and if the hold timer is still active. If so (Block 316=YES), the module 300 proceeds to block 312 to continue applying the offset. If not (block 316=NO) proceed to block 318, where the controller C is adapted to apply the rate limiter. The rate limiters control the speed of reaction of the host vehicle 12 and are used to appropriately react to the target vehicle T. For example, an aggressive rate limiter is applied when the target vehicle T has a relatively high velocity, such that the speed of application of the offset (moving the lateral position of the host vehicle 12) is faster compared to when the target vehicle T has a relatively low velocity.

Advancing to block 320 from block 318, controller C is adapted to deactivate the lateral offset and loop back to the beginning of module 300. The magnitude of the lateral offset and direction is determined such that it removes proximity of the target vehicle T with respect to the host vehicle 12. The lateral offset is also held appropriately depending on nature of target, for example, if a chain of target vehicle is detected, then the lateral offset is held for longer time. Finally, the contribution from the target encroachment from the left and right side is neutralized to keep the host vehicle 12 centered if encroachment is detected on both left and right sides. The final lateral offset is provided to calculate an optimal path 274.

Figure 5:
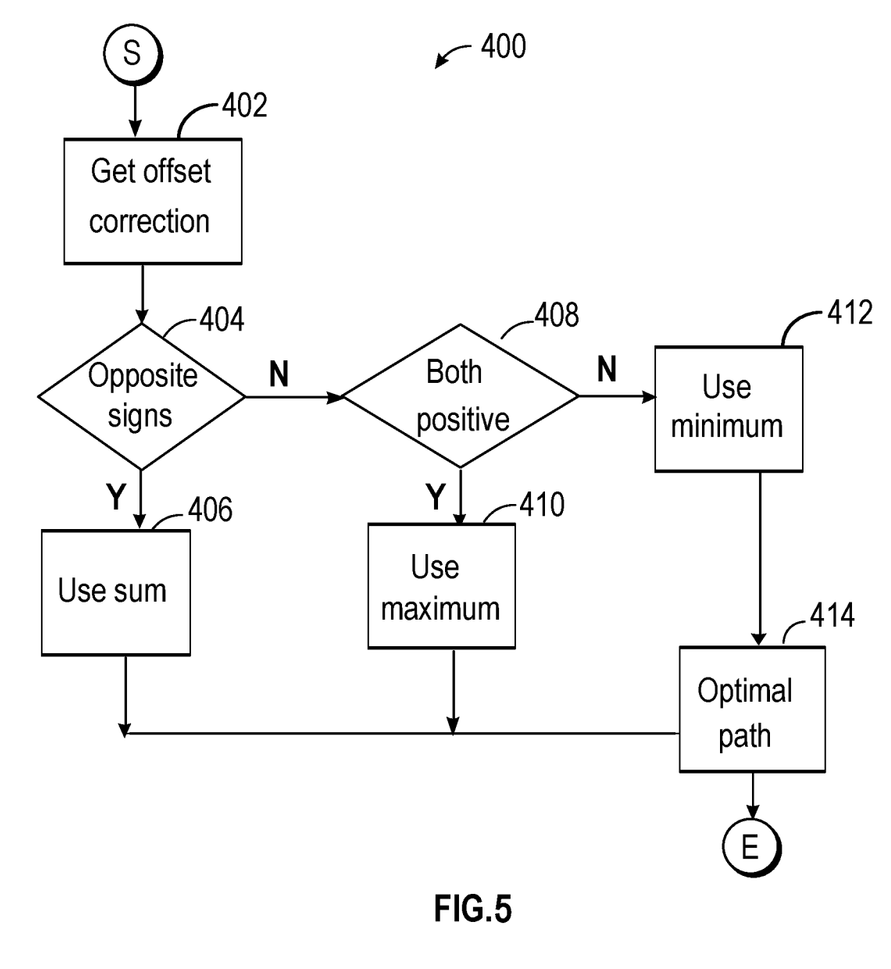
FIG. 5 is a flowchart for a net lateral correction module executable by the controller of FIG. 1.

Referring now to FIG. 5, a flowchart for the net lateral correction module 400 is shown. First per block 402, an offset correction (e.g., offset correction 236 in FIG. 3) is calculated based on multiple functions, such as a vehicle encroachment lateral offset (obtained in module 300 shown in FIG. 4). The offset correction may include a behavioral planner lateral offset, a straddle lateral offset, a motion profile lateral offset and a curvature lateral offset. The offset correction may include a driver steering correction. In some embodiments, the system 10 is adapted to monitor steering input from an operator of the host vehicle 12 for dynamic lateral offset magnitude adjustment (e.g., prioritizing steering to one side or another) or adjusting the maximum amount of allowed offset.

Proceeding to block 404 of FIG. 5, the controller C is adapted to determine if the offset correction (e.g., offset correction 236 in FIG. 3) and the non-divided road offset (e.g., offset 232 in FIG. 3) are both in the opposite direction. In FIG. 3, the non-divided road offset 232 extends from the host lane center 230 to a reference line 234. If so (block 404=YES), the module 400 advances to block 406, where the sum of the offset correction and the non-divided road offset is taken as the net lateral offset 272 (see in FIG. 3).

If not (block 404=NO), the module 400 advances to block 408, where the controller C is adapted to determine if the offset correction and the non-divided road offset are both positive. If the offset correction and the non-divided road offset are both positive (block 408=YES), the module 400 advances to block 410, where the maximum of the offset correction and the non-divided road offset is taken as the net lateral correction.

If the offset correction and the non-divided road offset are both negative (block 408=NO), the module 400 advances to block 412, where the minimum of the offset correction and the non-divided road offset is taken as the net lateral correction. From blocks 406, 410 and 412, the module 400 proceeds to block 414 where the net lateral correction may be used to generate an optimal path 274 that creates a final blend path trajectory. The net lateral correction may be transmitted to a vehicle planning module for generating an overall trajectory plan for the vehicle 12.

Referring to FIG. 1, a wireless network 60 may be utilized for communications between the controller C and cloud computing service 52. The wireless network 60 may be a short-range network or a long-range network. The wireless network 60 may be a communication BUS, which may be in the form of a serial Controller Area Network (CAN-BUS). The wireless network 60 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 60 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

In summary, the system 10 enables determination of a non-divided road offset 32, 232 for a host vehicle 12 in real-time. The amount and direction of the non-divided road offset relative to lane center varies based on road geometry, traffic, and environmental factors. The system 10 is adapted to monitor adjacent surface conditions (e.g., type, width, distance to transition), the presence and positioning of detected pedestrians, and road configuration.

The system 10 is adapted to modify or correct the non-divided road offset 32, 232 based on a number of factors, For example, the system 10 identifies presence of on-coming traffic as well as determined desirability of reaction by monitoring relative velocity of on-coming vehicles and tracking on-coming object lane positioning (centered, biased left, biased right). Offset behavior may be adjusted based on detecting host trailering conditions (trailer detected, dimensions, etc.) and relative lane position of the vehicle 12. The system 10 may be adapted to monitor driver steering input for dynamic lateral offset magnitude adjustment (e.g., prioritizing steering to one side or another) or adjusting the maximum amount of allowed offset.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling lateral positioning in a host vehicle, the system comprising:
a controller having a processor and tangible, non-transitory memory on which instructions are recorded, the host vehicle being located on a host lane defined by a host lane center, the controller being adapted to:
determine if a first enabling condition and a second enabling condition are met;
when the first enabling condition and the second enabling condition are both met, determine a non-divided road offset relative to the host lane center for the host vehicle in real-time, the non-divided road offset being based on a plurality of factors; and
control operation of the host vehicle based in part on a magnitude, and a direction of the non-divided road offset;
wherein the first enabling condition is met when the host vehicle is travelling on a non-divided road, the non-divided road having no physical barrier separating respective traffic lanes travelling in opposing directions;
wherein the non-divided road includes a non-drivable surface as a dividing section between respective traffic lanes travelling in opposing directions, the non-drivable surface having a lateral width less than a predefined threshold distance;
wherein the second enabling condition is met when the host lane is an inner most lane adjacent to an opposing traffic lane; and
wherein the controller does not determine the non-divided road offset unless both the first enabling condition and the second enabling condition are satisfied.

2. The system of claim 1, wherein the predefined threshold distance is between 2.5 meters and 4 meters.

3. The system of claim 1, wherein the plurality of factors includes a pedestrian gain, the controller being adapted to apply the pedestrian gain when a pedestrian is detected within minimum longitudinal distance from the host vehicle and/or a minimum lateral distance from the host vehicle.

4. The system of claim 1, wherein the plurality of factors includes a shoulder gain, the controller being adapted to apply the shoulder gain when a nearby adjacent surface is detected as a lane edge, the shoulder gain being based in part on a lateral distance of the lane edge from a boundary of the host lane.

5. The system of claim 1, wherein:
the controller is adapted to determine a net lateral offset for the host vehicle based in part on the non-divided road offset and an offset correction; and
the offset correction includes a vehicle encroachment lateral offset based on a target vehicle, the target vehicle being within a predefined proximity of the host vehicle.

6. The system of claim 5, wherein the target vehicle is in an oncoming lane adjacent to the host lane, the target vehicle travelling in an opposite direction relative to the host vehicle.

7. The system of claim 5, wherein the target vehicle is in a lane directly adjacent to the host lane, the target vehicle travelling in a same direction as the host vehicle.

8. The system of claim 5, wherein the offset correction includes a steering input from an operator of the vehicle.

9. The system of claim 5, wherein:
a maximum of the offset correction and the non-divided road offset is set as the net lateral correction when the offset correction and the non-divided road offset are both positive;
a minimum of the offset correction and the non-divided road offset is set as the net lateral correction when the offset correction and the non-divided road offset are both negative; and
a sum of the offset correction and the non-divided road offset is set as the net lateral offset when the offset correction and the non-divided road offset are in opposite directions.

10. The system of claim 5, wherein the controller is adapted to selectively apply a rate limiter such that a speed of application of the net lateral offset is faster when the target vehicle has a relatively high velocity compared to when the target vehicle has a relatively low velocity.

11. A method of controlling lateral positioning in a host vehicle with a controller having a processor and tangible, non-transitory memory on which instructions are recorded, the method comprising:
determining if a first enabling condition and a second enabling condition are met, via the controller, the host vehicle being located on a host lane defined by a host lane center;
setting the first enabling condition to be met when the host vehicle is travelling on a non-divided road, the non-divided road lacking a physical barrier separating respective traffic lanes travelling in opposing directions, wherein the non-divided road includes a non-drivable surface as a dividing section between respective traffic lanes travelling in opposing directions, the non-drivable surface having a lateral width less than a predefined threshold distance;
setting the second enabling condition to be met when the host lane is an inner most lane adjacent to an opposing traffic lane;
determining a non-divided road offset relative to the host lane center for the host vehicle in real-time when both the first enabling condition and the second enabling conditions are both met, via the controller, the lateral offset being based on a plurality of factors, wherein the controller does not determine the non-divided road offset unless both the first enabling condition and the second enabling condition are satisfied; and
controlling operation of the host vehicle based in part on a magnitude of the lateral offset, and a direction of the non-divided road offset.

12. The method of claim 11, further comprising:
incorporating a pedestrian gain in the plurality of factors, the controller being adapted to apply the pedestrian gain when a pedestrian is detected within a minimum longitudinal distance from the host vehicle and a minimum lateral distance from the host vehicle.

13. The method of claim 11, further comprising:
incorporating a shoulder gain in the plurality of factors, the controller being adapted to apply the shoulder gain when a nearby adjacent surface is detected as a lane edge, the shoulder gain being based in part on a lateral distance of the lane edge from a boundary of the host lane.

14. The method of claim 11, further comprising:
determining a net lateral offset for the host vehicle based in part on the non-divided road offset and an offset correction, via the controller; and
incorporating a steering input from an operator of the vehicle in the offset correction, via the controller.

15. The method of claim 11, further comprising:
determining a net lateral offset for the host vehicle based in part on the non-divided road offset and an offset correction, via the controller, the offset correction includes a vehicle encroachment lateral offset based on a target vehicle, the target vehicle being within a predefined proximity of the host vehicle.

16. The method of claim 15, further comprising:
selectively applying a rate limiter, via the controller, such that a speed of application of the net lateral offset is faster when the target vehicle has a relatively high velocity compared to when the target vehicle has a relatively low velocity.

* * * * *